United States Patent
Jankowski et al.

(10) Patent No.: US 11,595,379 B2
(45) Date of Patent: Feb. 28, 2023

(54) MECHANISM OF COMMON AUTHENTICATION FOR BOTH SUPERVISOR AND GUEST CLUSTERS

(71) Applicant: VMware, Inc., Palo Alto, CA (US)

(72) Inventors: Michal A. Jankowski, Sunnyvale, CA (US); Mark Johnson, McKinleyville, CA (US); Fanny Strudel, Sunnyvale, CA (US); Zachary James Shepherd, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 290 days.

(21) Appl. No.: 16/918,709

(22) Filed: Jul. 1, 2020

(65) Prior Publication Data
US 2022/0006801 A1 Jan. 6, 2022

(51) Int. Cl.
*H04L 9/40* (2022.01)

(52) U.S. Cl.
CPC .......... *H04L 63/083* (2013.01); *H04L 63/105* (2013.01); *H04L 63/20* (2013.01)

(58) Field of Classification Search
CPC ..... H04L 63/083; H04L 63/105; H04L 63/20; H04L 63/0807; H04L 63/0815
USPC ............................................................ 726/1
See application file for complete search history.

(56) References Cited

U.S. PATENT DOCUMENTS

| | | | |
|---|---|---|---|
| 10,037,339 B1* | 7/2018 | Kleinpeter | G06F 16/2365 |
| 2016/0127855 A1* | 5/2016 | Zhang | H04H 60/15 |
| | | | 455/41.2 |
| 2019/0394187 A1* | 12/2019 | Fletcher | H04L 9/3213 |
| 2021/0311764 A1* | 10/2021 | Rosoff | G06F 9/5077 |
| 2021/0314388 A1* | 10/2021 | Zhou | H04L 41/40 |

* cited by examiner

*Primary Examiner* — Kambiz Zand
*Assistant Examiner* — Aubrey H Wyszynski
(74) *Attorney, Agent, or Firm* — Dentons US LLP

(57) ABSTRACT

This disclosure describes a computer implemented method for receiving authentication credentials identifying a user; identifying computing systems for which the user is authorized access to; and transmitting tokens granting access to the identified computing systems. In some embodiments, no two tokens of the transmitted tokens grants access to the same one of the identified computing systems. The user typically has access to a management tool configured to manage the transmission of the received tokens to the corresponding computing systems, thereby granting the user the ability to have seamless access to any of the computing systems associated with the user's authenticated identity.

20 Claims, 7 Drawing Sheets

MECHANISM OF COMMON AUTHENTICATION FOR BOTH SUPERVISOR AND GUEST CLUSTERS

FIELD

The present disclosure relates generally to minimizing the number of times an administrator is asked to authenticate their credentials when administrating server clusters.

BACKGROUND

Administrators often find themselves managing multiple computing systems and/or networks that can be distributed geographically and/or virtually. In order to avoid a situation in which a bad actor that has gained some level of access to one of the multiple computing systems is able to infiltrate the rest of the computing systems, the administrators are generally asked to maintain large lists of sign-on credentials in order to securely authenticate themselves as administrators to each of the multiple computing systems. This can become quickly unmanageable where the administrators are asked to monitor or administrate over hundreds of computing systems. For this reason, a mechanism for providing the administrators a secure but less burdensome way to access the multiple systems without compromising security is desirable.

SUMMARY

This disclosure describes mechanisms for providing a user access to multiple computing systems based on a single authentication.

A computer implemented method for authenticating a user is disclosed. The computer implemented method includes: receiving credentials identifying a user; authenticating the credentials identifying the user; identifying a first computing system and a second computing system the user is authorized to access from a plurality of computing systems based on the authentication of the credentials; and transmitting a first token to the user that provides access to the first computing system and a second token to the user that provides access to the second computing system. The first token does not provide access to the second computing system and the second token does not provide access to the first computing system.

A non-transitory computer-readable storage medium storing instructions configured to be executed by one or more processors of a computing device is disclosed. The execution of the instructions by the processors cause the computing device to carry out steps that include: receiving authentication credentials identifying a user; authenticating the credentials identifying the user; identifying a first computing system and a second computing system the user is authorized to access from a plurality of computing systems based on the authentication of the credentials; transmitting a first token to the user that provides access to the first computing system; and transmitting a second token to the user that provides access to the first computing system and the second computing system. The first token provides more access to the first computing system than the second token provides to the first computing system.

A computer system is disclosed and includes one or more processors; and memory storing one or more programs configured to be executed by the one or more processors, the one or more programs including instructions for: receiving authentication credentials identifying a user; identifying computing systems from a plurality of computing systems the user is authorized to access; and transmitting a first token to the user that provides access to a first computing system of the plurality of computing systems and a second token to the user that provides access to a second computing system of the plurality of computing systems. The first token provides access only to the first computing system.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
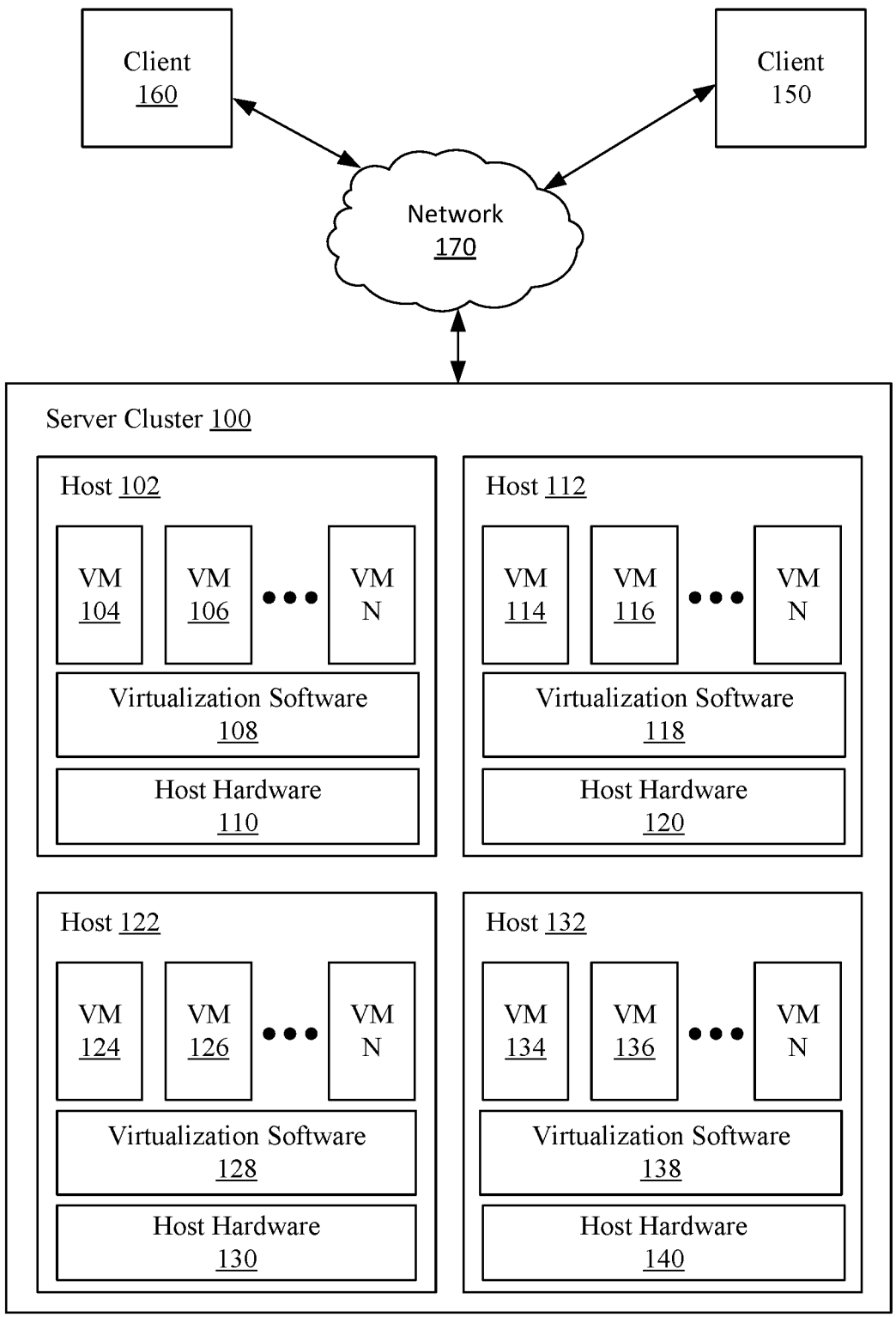
FIG. 1 shows a diagram illustrating an exemplary server cluster suitable for use with the embodiment described herein.

Certain details are set forth below to provide a sufficient understanding of various embodiments of the invention. However, it will be clear to one skilled in the art that embodiments of the invention may be practiced without one or more of these particular details. Moreover, the particular embodiments of the present invention described herein are provided by way of example and should not be used to limit the scope of the invention to these particular embodiments. In other instances, hardware components, network architectures, and/or software operations have not been shown in detail in order to avoid unnecessarily obscuring the invention.

Administrators are generally trusted with broad access to the resources of multiple computing systems, servers and/or server clusters. For this reason, owners of these resources expect the administrators to maintain unique credentials to avoid a situation in which a stolen set of credentials can be used for unauthorized access to a number of different systems.

One solution to this issue is when an administrator logs in to a trusted system, the trusted system can include a module that checks the credentials provided by the administrator to identify the administrator and then generates tokens for each of the systems that the identified administrator has access to. In this way, when the administrator attempts to access a particular system, a particular token that applies only to that particular system being accessed is transmitted to that system. This configuration has the following advantages: (1) the administrator is not required to enter new credentials to gain access to the system; (2) a rogue administrator or another bad actor that has somehow intercepted or stolen the transmitted token only gains access to the particular system associated with the transmitted token; (3) attempts to improperly use the token can be more easily logged and tracked since each token is only used to gain access to particular systems; and (4) since the administrator is only responsible for maintaining a single set of credentials in a single authentication system, additional security measures such as more frequent password changes, two factor authentication and biometric verification can be put in place without unduly burdening the administrator. It should be noted that while this application will discuss the specific instance where an administrator is being authenticated across multiple systems or server clusters that the described embodiments may also apply to users without elevated privileges in a manner that reduces the likelihood of a user's access to multiple systems being compromised.

Another benefit of the disclosed authentication method is that the trusted authentication system is in at least periodic communication with all the other systems for which it is configured to create and issue tokens. In some embodiments, the systems can take the form of supervisor clusters and guest clusters. Supervisor clusters use virtual machines (VMs) to implement both control plane nodes and compute objects managed by the Kubernetes® control plane. For example, Kubernetes® pods are implemented as "pod VMs," each of which includes a kernel and container engine that supports execution of containers. The Kubernetes® control plane of the supervisor cluster is extended to support VM objects in addition to pods, where the VM objects are implemented using native VMs (as opposed to pod VMs). Guest clusters include a standard Kubernetes® control plane and associated nodes, as well as components for interfacing the underlying supervisor cluster. The guest cluster executes within compute objects managed by the supervisor cluster (e.g., native VMs or both native VMs and pod VMs) and utilizes networking and storage exposed by the supervisor cluster. In this manner, a guest cluster is a virtual extension of an underlying management cluster (i.e., the supervisor cluster) The communication with the other systems allows the trusted authentication system to assist in maintaining security compliance for the systems for which it generates tokens. For example, if a guest cluster changes a security policy it can request that the trusted authentication system confirm that the trusted authentication system will comply with or has already complied with the changed security policy. In cases where the trusted authentication system is unable to comply with the new security policy, the system with the new security policy could suspend authorization for the trusted authentication system to issue new tokens for the system until the new security policy is met by the trusted authentication system.

These and other embodiments are discussed below with reference to FIGS. 1-5; however, those skilled in the art will readily appreciate that the detailed description given herein with respect to these figures is for explanatory purposes only and should not be construed as limiting.

FIG. 1 shows a block diagram illustrating an exemplary server cluster 100 suitable for use with the embodiment described in this disclosure. Server cluster 100 can include hosts 102, 112, 122 and 132. While a four host system is shown for exemplary purposes it should be appreciated that server cluster 100 could include a larger or smaller number of hosts. Each host 102-132 includes host hardware 110-140, which can include a designated amount of processing, memory, network and/or storage resources. In some embodiments, each of the hosts provide the same amount of resources, and in other embodiments, the hosts are configured to provide different amounts of resources to support one or more virtual machines (VMs) running on the hosts. Each of the VMs can be configured to run a guest operating system that allows for multiple applications or services to run within the VM.

Each of hosts 102, 112, 122 and 132 are capable of running virtualization software 108, 118, 128 and 138, respectively. The virtualization software can run within a virtual machine (VM) and includes management tools for starting, stopping and managing various virtual machines running on the host. For example, host 102 can be configured to stop or suspend operations of virtual machines 104 or 106 utilizing virtualization software 108. Virtualization software 108, commonly referred to as a hypervisor, can also be configured to start new virtual machines or change the amount of processing or memory resources from host hardware 110 that are assigned to one or more VMs running on host 102. Host hardware 110 includes one or more processors, memory, storage resources, I/O ports and the like that are configured to support operation of VMs running on host 102. In some embodiments, a greater amount of processing, memory or storage resources of host hardware 110 is allocated to operation of VM 104 than to VM 106. This may be desirable when, e.g., VM 104 is running a larger number of services or running on a more resource intensive operating system than VM 106. Clients 140 and 150 are positioned outside server cluster 100 and can request access to services running on server cluster 100 via network 160. Responding to the request for access and interacting with clients 140 and 150 can involve interaction with a single service or in other cases may involve multiple smaller services cooperatively interacting to provide information requested by clients 140 and/or 150.

Hosts 102, 112, 122 and 132, which make up server cluster 100, can also include or have access to a storage area network (SAN) that can be shared by multiple hosts. The SAN is configured to provide storage resources as known in the art. In some embodiments, the SAN can be used to store log data generated during operation of server cluster 100. While description is made herein with respect to the operation of the hosts 110-140, it will be appreciated that those of hosts 110-140 provide analogous functionality, respectively.

Figure 2:
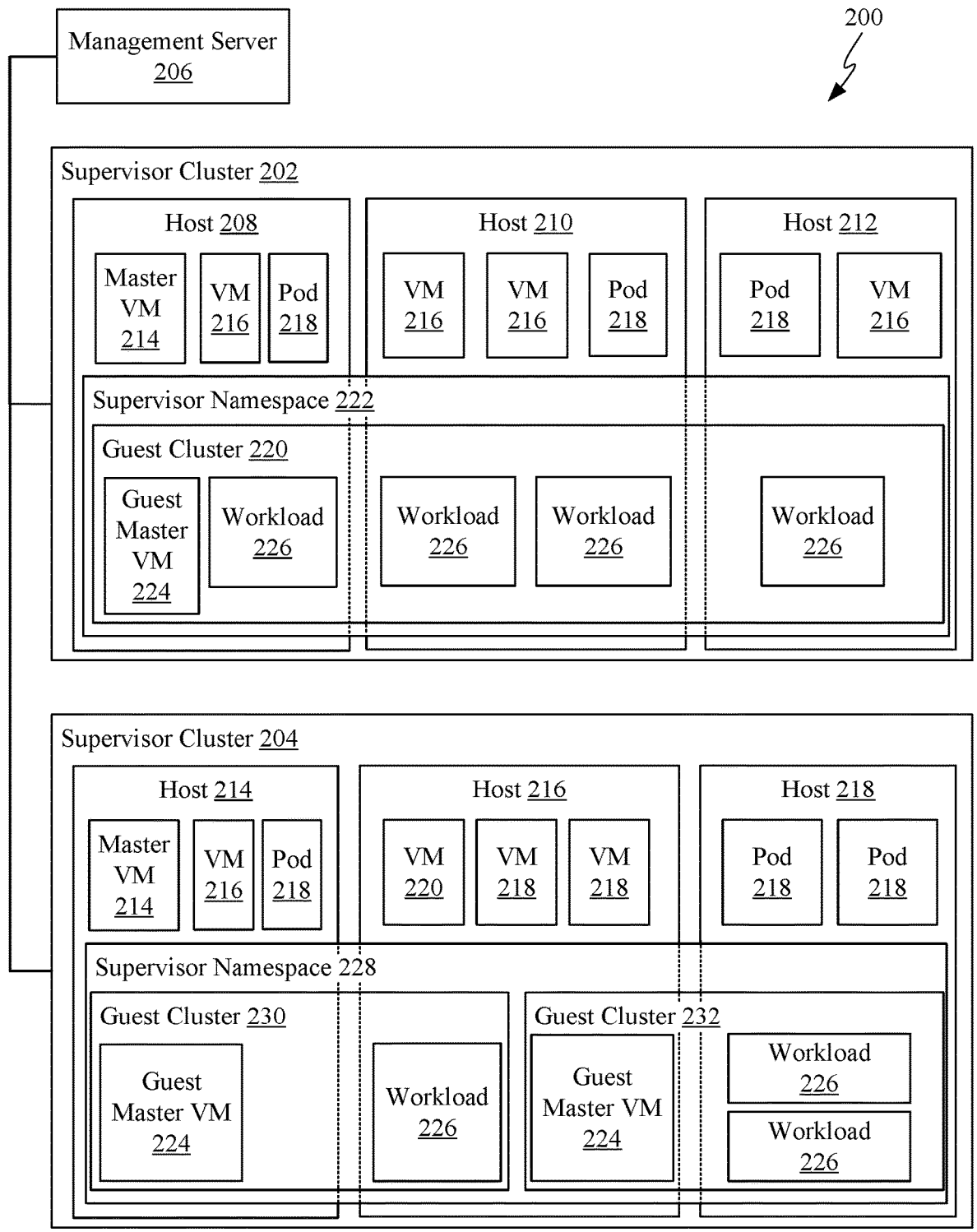
FIG. 2 shows another exemplary computing environment that includes multiple server clusters in communication with a management server.

FIG. 2 shows another exemplary computing environment 200 that includes supervisor clusters 202 and 204 in communication with a management server 206. In some embodiments, management server 206 can take the form of a vCenter Server that is able to communicate and perform administrative tasks to keep each of the cluster and hosts within their respective clusters functioning properly. In some embodiments, each of supervisor clusters 202 and 204 can include virtualization components and various hardware similar to those described in cluster 100 depicted in FIG. 1; however, for purposes of focus and clarity some of those components have been omitted from FIG. 2. Supervisor cluster 202 includes hosts 208, 210 and 212, however, it should be appreciated that a larger or smaller number of hosts could be included in each of the depicted clusters. In particular, host 208 can include virtualization software that facilitates the creation of a master virtual machine (VM) 212. Master VM 214 can operate on a modified Kubernetes framework that allows it to govern and administer a number of VMs 216, pods 218 and/or guest clusters 220 running on one or more VMs. It should be noted that the master VMs do not have to run on a Kubernetes framework and that this is merely one exemplary implementation. Master VM 214 includes authentication components that work in conjunction with management server 206 to form a trusted authentication system allowing for the secure authentication of users and particularly administrators. In some embodiments, these authentication components can include tools for interacting with and receiving sign-on credentials taking many forms. For example, sign-on credentials can be received from any of the following: (1) a reader capable of transmitting credentials stored on an identification badge, security card or electronic device; (2) one or more biometric readers configured to scan and transmit one or more identifying features of a user by analyzing a user's retina, finger prints and/or voice; and (3) a user input device configured to allow the user to enter a username and password. Some services can require a user to submit multiple forms of authentication from one or more of the aforementioned categories.

Host 208 can run different types of workloads that include VMs 216 and pods 218. Pods 216 can run natively on virtualization software associated with hosts 208, 210 and 212 of supervisor cluster 202. Pods 216 are capable of supporting multiple containers within a native Kubernetes environment. Supervisor cluster 202 can also be configured to support one or more guest clusters. Guest cluster 220 is shown supporting a multiple workloads 226 that draw resources from any or all of the hosts included within supervisor cluster 202. It should be noted that while guest cluster 220 is shown running workloads 226 as opposed to specific types of workloads, workloads 226 refer broadly to virtual constructs such as containers, pods or VMs. Guest cluster 220 can be positioned within a namespace 222 that provides an abstraction onto which administrators are able to attach policy. In some embodiments, this policy is applied to namespaces to help with establishing permissions for one or more guest clusters. For example, supervisor namespace 228 can be configured to allow establishment of the same permissions for both guest cluster 230 and guest cluster 232. In some embodiments, each of VMs 216, pods 218 and guest clusters 220/228/230 can be configured with different security rules that allow users different levels of access to content hosted on the same host and/or server. To support this type of functionality users are often required to provide credentials when initially accessing a different service. In some embodiments, a service running on one VM or container may be able to auto-scale across different hosts or clusters to give a user access to another VM or container running the same service without requiring the user to provide a new set of sign-on credentials.

Figure 3:
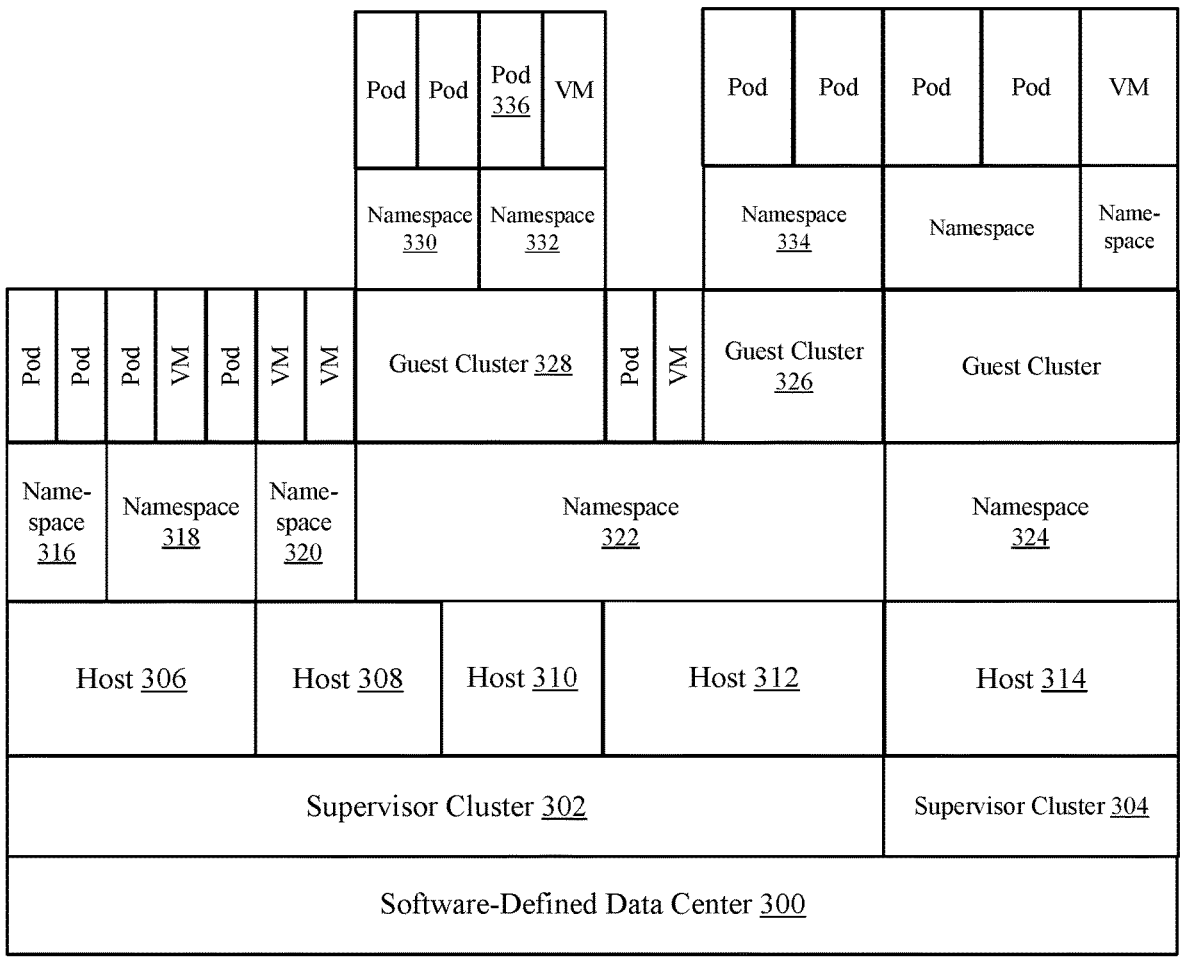
FIG. 3 shows an exemplary configuration illustrating how namespaces can help to organize a large number of workloads running across multiple supervisor and guest clusters.

FIG. 3 shows an exemplary configuration illustrating how namespaces can help to organize a large number of workloads being run across multiple supervisor and guest clusters. Software-Defined Data Center 300 can include a management server configured to manage multiple clusters, such as supervisor clusters 302 and 304. As depicted, the supervisor clusters can include one or more hosts 306-314 that provide the computing resources necessary to drive various workloads including VMs, Pods and/or Guest Clusters. Supervisor cluster 302 is shown including multiple namespaces 316-322 for assisting with management of the various workloads running on supervisor cluster 302. Namespaces can span multiple hosts as shown by namespace 322. The namespaces can also be utilized to separate guest clusters 326 and 328 from other workloads running on supervisor cluster 302. In some embodiments, this configuration allows the namespaces to establish a default set of permissions for users or administrators related to guest clusters 326 and 328 to be different than permissions for users needing to interact with and/or administer over workloads running within namespaces 316-320. Furthermore, access permissions can also be configured to vary across namespaces 316, 318 and 320.

FIG. 3 also shows how guest clusters 326 and 328 can include guest level namespaces 330, 332 and 334 for assigning permissions to workloads running within the guest clusters. This can allow for multiple namespaces to help define roles and permissions for users or administrators primarily working within one of the guest clusters. For example, default permissions for a user or administrator primarily working with workloads within namespace 332, such as containers associated with pod 336, could be affected by default rules of both namespaces 322 and 332. In this way, the namespaces allow implementation of a hierarchical permission structure. For example, in the case where a first token is configured to provide an identity of a particular user to guest cluster 328, namespace 322 can have rules granting all authenticated users of guest cluster 328 or namespaces 330 and 332 access to a limited number of resources of supervisor cluster 302. In this way, use of the first token could grant the user limited access to assets of supervisor cluster 302 without having to provide a token identifying the user to supervisor cluster 302. In the event the user had greater access to supervisor cluster 302, a second token compatible with supervisor cluster 302 but not with guest cluster 328 could be transmitted directly to supervisor cluster 302 to identify the user to the supervisor cluster 302 when the greater access to supervisor cluster 302 is needed. In some embodiments, gaining access to supervisor cluster 302 could provide limited access to assets of guest cluster 328 by virtue of rules of namespace 330 or 332 authorizing the limited access without directly verifying the identity of the user. In the described configuration, the first token would not be accepted by or compatible with supervisor cluster 302 since the first token is setup specifically to be recognized and accepted by guest cluster 328 even though the user identified by the token is granted access to supervisor cluster 302.

Figure 4A:
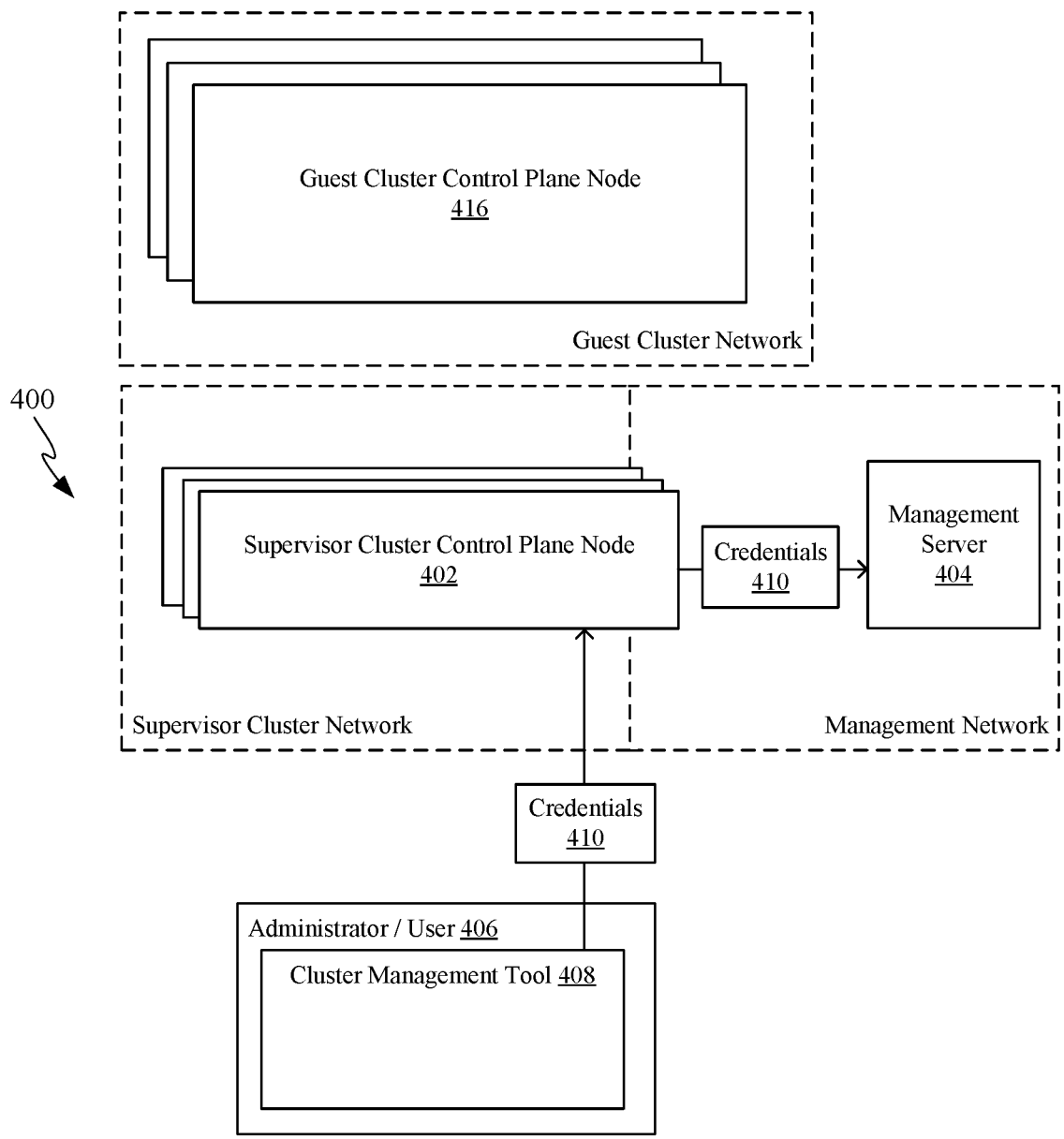
FIGS. 4A-4C shows a process by which a trusted authentication system is able to establish a delegated single sign-on system.
Figure 4B:
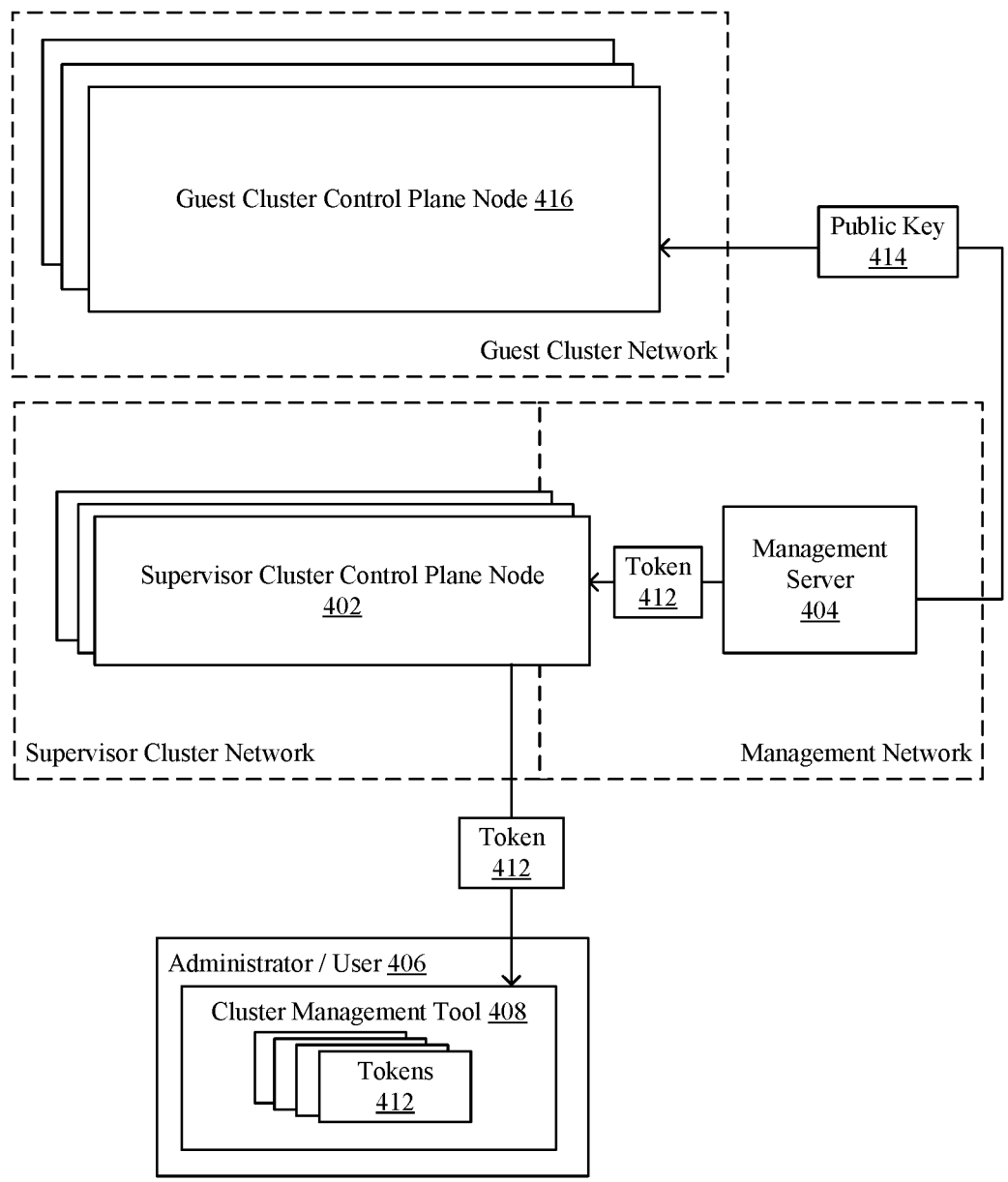
Figure 4C:
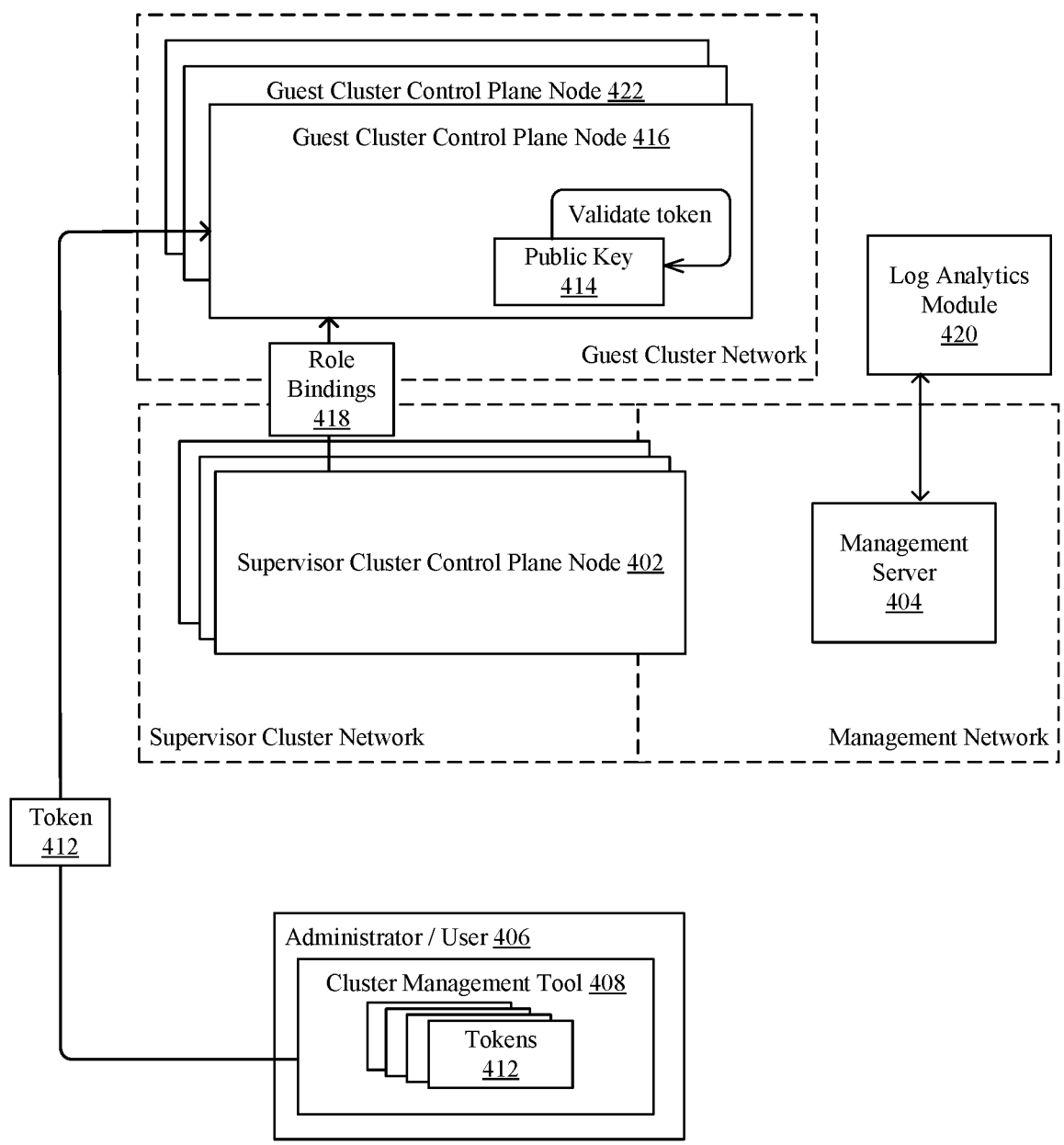

FIGS. 4A-4C show a block diagram illustrating how a trusted authentication system 400 that includes components positioned within a supervisor cluster control plane node 402 and a management server 404 can be utilized to grant secure delegated single sign on access to services running within computing environment 200 or software-defined data center 300. Since management server 404 can be responsible for managing multiple supervisor clusters, supervisor cluster control plane 402 is shown as one of multiple supervisor cluster control plane nodes. Supervisor cluster control plane 402 can be positioned within one of master VMs 214 as described in FIG. 2. FIG. 4A shows how an administrator/user 406 can be logged into a computing system running a cluster management tool 408, such as kubectl, that allows administrator/user 406 to communicate and interact with trusted authentication system 400 by transmitting credentials 410 to supervisor control plane node 402. While administrator 406 is shown transmitting credentials 410 to supervisor control plane node 402 it should be noted that administrator could also transmit credentials 410 to another supervisor cluster control plane of computer environment 200 with similar results. Credentials sent using cluster management tool 408 can take the form of a user name/password or biometric information that positively establishes the identity of administrator 402. Depending on the security associated with the computing system multiple different types of credentials may be required to satisfy security policies. For example, an administrator could be required to enter a username and password and also transmit biometric readings to supervisor cluster control plane 402 to confirm the administrator's identity to trusted authentication system 400. While supervisor cluster control plane node 402 receives these credentials, it acts as an authentication proxy by forwarding credentials 410 on to management server 404 for validation by a single sign on service running on management server 404. When management server 404 receives credentials 410, management server 404 is configured to determine which clusters and workloads administrator 406 has access to. In some embodiments, this access information can be compiled in an access list stored by management server 404 and periodically updated through communication channels between at least management server 404, supervisor cluster control plane node 402 and other workloads making up computing environment 200. Management server 404 then proceeds to create tokens granting administrator 406 access to each of the identified clusters and/or workloads.

In some embodiments, prior to creation of tokens 412 security policies for each of the guest clusters and workloads can be determined or reconfirmed. Security policies for trusted authentication system 400 will generally be set to whatever the strictest policies are from the virtual constructs. In the case where trusted authentication system 400 is incompatible with requirements of a particular security policy, the workload or guest cluster with the incompatible security policy can be removed from the delegated single sign-on system. In some embodiments, trusted authentication system 400 may also be configured to allow administrators without the tools necessary to meet the security requirements of every one of the virtual constructs with which the trusted authentication system 306 is in communication the option to receive tokens for only a subset of the guest clusters or workloads with which trusted authentication system 400 is in communication.

FIG. 4B shows how after credentials 410 are validated in accordance with the requisite security policies, management server 404 transmits tokens 412 back to supervisor control plane node 402, which then forwards tokens 412 on to cluster management tool 408 where tokens 412 are stored for use by cluster management tool 408. The number of tokens transmitted back to supervisor control plane node 402 can vary based on an identity of administrator 406. For example, an administrator with access to multiple supervisor clusters and three guest clusters could be issued four tokens that include one token with full access to the supervisor clusters and three tokens having access to respective ones of the three guest clusters. Generally, guest cluster associated tokens provide only limited access to supervisor cluster assets and other guest cluster assets so that a user gaining unauthorized access to an administrator token is not able to gain elevated privileges to all of the clusters running within computing environment 200. While the aforementioned example gives one way in which permissions granted by tokens can be limited, tokens can also be organized in other ways. For example, an administrator can receive one key providing access to all supervisor cluster workloads and another key for accessing workloads running on all guest clusters being hosted within the computing environment. This configuration would prevent a guest cluster user or guest cluster administrator with unauthorized access to an administrator token from gaining elevated access to workloads running within one or more of the supervisor clusters. Generally, administrator 406 receives multiple tokens 406 that provide different levels of access to different portions of the computing environment. For example, a first tokens 412 may completely prevent access to all of a particular cluster or workload while a second token 412 provides full administrative access to that particular cluster. In other embodiments, the first token 412 provides partial access to the particular cluster while the second token 412 provides full administrative access to the particular cluster.

Each of tokens 412 can include a private key providing access to secure information stored or accessible within the computing environment. Management server 404 will also repeatedly send updated tokens 412 to administrator 406 by way of supervisor cluster control panel 402 prior to previously issued tokens 412 expiring. In addition to providing tokens 412 to administrator 406 management server 404 can also be configured to transmit a public signing key 414 to guest cluster node 416. Guest cluster control plane node 416 can run within one of the guest master VMs associated with supervisor cluster control plane node 402. Public signing key 416 can be configured to recognize and validate the newly issued tokens 412 and any other valid tokens currently in use within the computing environment. While management server 404 is shown only sending public key 414 to guest cluster plane node 416 it should be appreciated that in some embodiments any time a change is made to public key 414 management server 404 would be configured to distribute public key 414 to all of the control plane nodes located in the computing environment.

FIG. 4C shows cluster management tool 408 being used to transmit one of tokens 412 to guest cluster control plane node 416. It should be noted that cluster management tool 408 can receive information about which of tokens 412 to use with each respective control plane node. In some embodiments, this information can be transmitted along with tokens 412 and in other embodiments this information can be included as identification information in each of tokens 412 allowing cluster management tool 408 to transmit tokens 412 corresponding to the cluster or clusters administrator 406 requests access to. FIG. 4C shows how public key 414 that was received by guest cluster control plane node 416 from management server 404 can be processed by an authorization service of guest cluster control panel node to validate tokens 412. Validation of token 412 can include checking its expiration date/time, determining an identity of the user associated with token 412 and determining whether token 412 provides access to the cluster for the identified user. In the case cluster management tool 408 sends the wrong token or a user with unauthorized access to token 412 sends token 412 to the wrong cluster, even when the identified user would normally have access to the cluster token 412 access to the cluster would still be denied.

FIG. 4C shows how a synchronization service running within supervisor control plane node 402 can be configured to transmit namespace role bindings 418 to guest cluster control plane node 416. In some embodiments, an API server running within guest cluster control plane node 416 can receive namespace role binding data 418 and transmit any updated namespace role binding data to an authorization service of guest cluster control plane node 416 in order to apply the correct permissions for users of the guest cluster. This communication path can also be used to make updates for particular users or groups of users when manually updated by an administrator such as administrator 406. It should be noted that trusted authentication system 400 can also help keep administrator 406 connected to the various guest clusters and workloads by notifying administrator 406 when any security policies have changed and require new or more detailed credentials be delivered to allow continued access for administrator 406. In this way, administrator 302 can update the credentials as described in FIG. 4A prior to losing access to the system due to more stringent security policies. In some embodiments, administrator 406 can receive a notification stating an amount of time left to send updated credentials prior to administrator 406 losing access to the guest cluster or workloads with elevated security policies.

FIG. 4C also shows how a log analytics module 420 can be in communication with management server 404. In some embodiments, log analytics module 420 can be configured to monitor authentication logs of computing environment 200 for improper use of tokens 412. For example, when a log shows a token 412 that is authorized to access only the guest cluster associated with guest cluster control plane node 216 being used to attempt to access the guest cluster associated with guest cluster control plane node 422, then a processing circuit of log analytics module 420 can determine that the improper use of token 412 was likely perpetrated by a user with access to the guest cluster associated with guest cluster control plane node 416 on account of that token 412 only having been authorized for use with that guest cluster. So in addition to preventing access to a workload or guest cluster not specifically authorized by a particular token 412, this described delegated access single sign-on method also helps identify users attempting unauthorized access to protected resources of computing environment 200. In some embodiments, log analytics module 420 can be configured to transmit logs identifying unauthorized access attempts to trusted authentication system 400. In response to the preceding example, trusted authentication system 306 can be configured to adjust a level of trust associated with the guest cluster associated with guest cluster control plane node 416 until the cause of the unauthorized use of the token is determined. In some embodiments, where a threshold number of unauthorized attempts are determined to have originated from users of a particular guest cluster or workload, that guest cluster or workload can be removed from the cluster on account of its trust level having dropped too far to justify the continued security threat it represents. In some embodiments, trusted authentication system 400 includes a notification module that is configured to notify administrators of the offending guest cluster or workload when these types of unauthorized accesses are detected. This can allow for the administrators to tighten up security policies, resulting in improved security for the entire computing environment.

Figure 5:
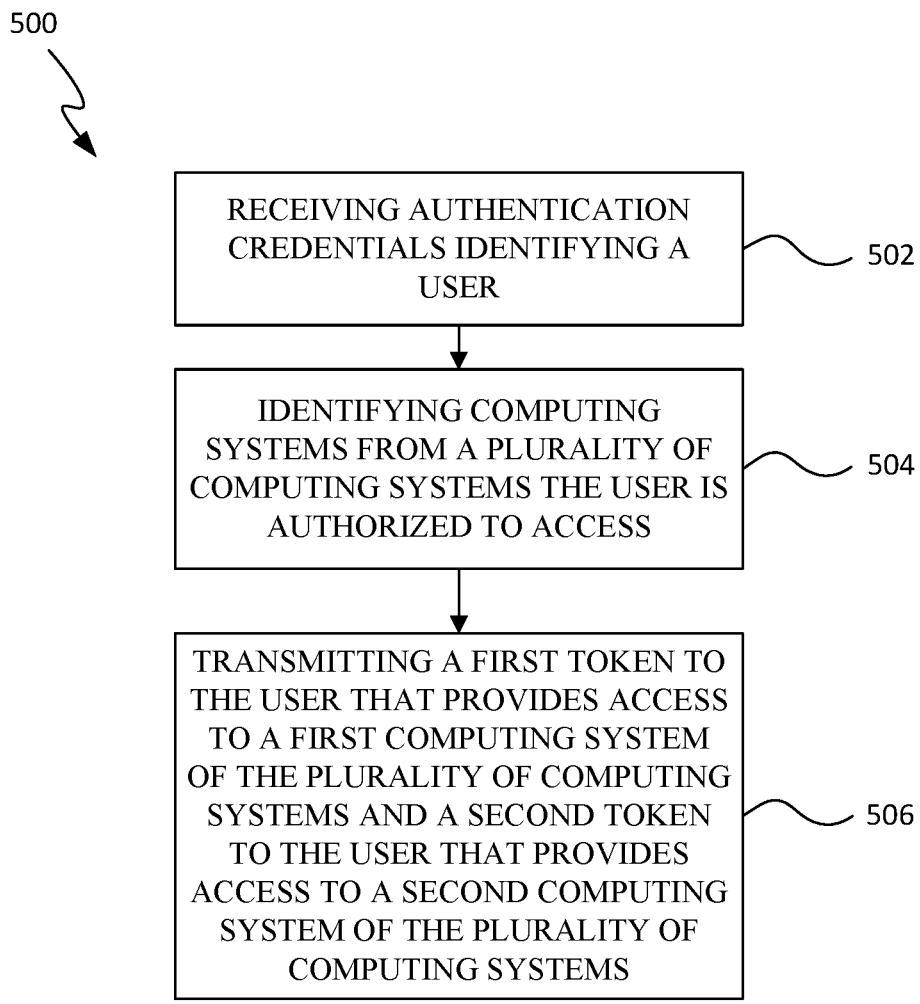
FIG. 5 shows a flow chart depicting a method for providing an authenticated user secure access to multiple computing systems.

FIG. 5 shows a flow diagram 500 illustrating a method for securely providing access to multiple resources of a computing system. The method can be performed by a trusted authentication system hosted on a server cluster that has been delegated permission to grant access to multiple resources on the server cluster and in some cases resources external to the server cluster. At 502, a request for access to system resources is received accompanied by authentication information identifying a user of the computing system. The authentication information can include one or more pieces of information including, e.g., user name and password, biometric scans, two factor authentication, scans of an access card and the like. At 504, once the authentication information has been confirmed to properly identify the user, the trusted authentication system can contact the multiple resources it has been granted access to, in order to determine which resources the user has been granted access to. In some embodiments, this information can be cached on the trusted authentication system. In this way, the trusted authentication system can identify which computing systems the user is authorized to access. At 506, the trusted authentication system generates tokens associated with the computing systems it is in communication with that have granted access to the authenticated user and that provide access only to a specific computing system for a limited period of time. For example, a particular token might grant the holder of the token access to a particular computing system for an hour or two after which the trusted authentication system would be responsible for delivering an updated token to allow the user to continue interacting with the particular computing system. The granting and updating of tokens may be transparent to the user as system processes can be configured to continuously ensure the user is able to continuously access the computing systems for which the user has been granted access.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computer implemented method for authenticating a user, the computer implemented method comprising:
   receiving credentials identifying a user;
   authenticating the credentials identifying the user;
   identifying a first computing system and a second computing system the user is authorized to access from a plurality of computing systems;
   transmitting a first token to the user that provides access to the first computing system and a second token to the user that provides access to the second computing system;
   receiving log data from a log analytics system showing a token issued to the user granting access to the first computing system has been used in an attempt to access a third computing system that the token is not configured to grant access to;
   reducing a trust level for the first computing system; and
   transmitting a notification to the first computing system informing the first computing system of the reason for the reduced trust level, wherein the first token does not provides access to the second computing system and the second token does not provide access to the first computing system.

2. The computer implemented method as recited in claim 1, wherein identifying the plurality of computing systems comprises communicating with the plurality of computing systems to determine which of the plurality of computing systems the user is authorized to access.

3. The computer implemented method as recited in claim 2, wherein access to the first computing system is based at least in part upon roles defined by a namespace within which the first computing system resides.

4. The computer implemented method as recited in claim 3, further comprising synchronizing namespace role bindings with the first computing system.

5. The computer implemented method as recited in claim 1, wherein the first computing system comprises a plurality of workloads running within a supervisor cluster and the second computing system comprises a guest cluster.

6. The computer implemented method as recited in claim 1, further comprising transmitting a third token to the user that provides access to both a third computing system and a fourth computing system that share the same namespace.

7. The computer implemented method as recited in claim 1, further comprising:
receiving an updated security policy from at least one computing system of the plurality of computing systems; and
when the user has an active token granting access to the at least one computing system and the updated security policy is stricter than any of previously established security policies, requesting the user provide new authentication credentials conforming with the updated security policy.

8. The computer implemented method as recited in claim 7, further comprising:
transmitting a notification to the user informing the user of when the active token granting access to the at least one computing system will expire if the new authentication credentials are not received.

9. The computer implemented method as recited in claim 1,
wherein the first computing system is a guest cluster.

10. The computer implemented method as recited in claim 1, wherein the first token is configured to identify the user to the first computing system, and the first computing system is configured to provide access to the user in accordance with an identity of the user provided by the token.

11. A non-transitory computer-readable storage medium storing instructions configured to be executed by one or more processors of a computing device cause the computing device to carry out steps that include:
receiving authentication credentials identifying a user;
authenticating the credentials identifying the user;
identifying a first computing system and a second computing system the user is authorized to access from a plurality of computing systems based on the authentication of the credentials;
transmitting a first token to the user that provides access to the first computing system; and
transmitting a second token to the user that provides access to the first computing system and the second computing system, wherein the first token provides more access to the first computing system than the second token provides to the first computing system;
receiving log data from a log analytics system showing a token issued to the user granting access to the first computing system has been used in an attempt to access a third computing system that the first token is not configured to grant access to;
reducing a trust level for the first computing system; and
transmitting a notification to the first computing system informing the first computing system of the reason for the reduced trust level.

12. The non-transitory computer-readable storage medium as recited in claim 1, wherein the steps further include:
periodically communicating with the plurality of computing systems to determine which of the plurality of computing systems the user still has authorization to access;
transmitting updated tokens to the user for computing systems that the user is determined to still have access; and
transmitting new tokens to the user that provide access to computing systems that the user is determined to have gained access.

13. The non-transitory computer-readable storage medium as recited in claim 12, wherein the tokens transmitted to the user are stored in a data repository that allows the user to access the computing systems the user is authorized to access.

14. The non-transitory computer-readable storage medium as recited in claim 12, wherein none of the updated tokens provide access to the same computing system.

15. The non-transitory computer-readable storage medium as recited in claim 11,
wherein authenticating the credentials identifying the user comprises confirming the received credentials comply with security policies associated with the identified computing systems; and
wherein identifying computing systems from the plurality of computing systems comprises receiving lists of authorized users from the plurality of computing systems.

16. A computer system, comprising:
one or more processors; and
memory storing one or more programs configured to be executed by the one or more processors, the one or more programs including instructions for:
receiving credentials identifying a user;
authenticating the credentials identifying the user;
identifying a first computing system and a second computing system the user is authorized to access from a plurality of computing systems based on the authentication of the credentials;
transmitting a first token to the user that provides access to the first computing system and does not provide access to the second computing system;
transmitting a second token to the user that provides access to the second computing system and does not provide access to the first computing system;
receiving log data from a log analytics system showing a tokens issued to the user granting access to the first computing system has been used in an attempt to access a third computing system that the token is not configured to grant access to;
reducing a trust level for the first computing system; and
transmitting a notification to the first computing system informing the first computing system of the reason for the reduced trust level, wherein the first token does not provides access to the second computing system and the second token does not provide access to the first computing system.

17. The computer implemented method as recited in claim 16, wherein the computer system includes a trusted authentication system running in a master virtual machine positioned in a first server cluster.

18. The computer implemented method as recited in claim 17, wherein the first computing system is located in the first server cluster and the second computing system is positioned in a second server cluster.

19. The computer implemented method as recited in claim 17, wherein the first computing system and the second computing system are both positioned in the first server cluster.

20. The computer implemented method as recited in claim 18, wherein the first and second server clusters are managed by the same management server.

* * * * *